(12) United States Patent
Mayweather et al.

(10) Patent No.: US 6,983,403 B2
(45) Date of Patent: Jan. 3, 2006

(54) DETECTING BIT ERRORS IN A COMMUNICATIONS SYSTEM

(75) Inventors: Derek Mayweather, Mountain View, CA (US); Steven Gemelos, MenloPark, CA (US); Neil Mammen, San Jose, CA (US); Jason Fan, Mountain View, CA (US)

(73) Assignee: Luminous Networks, Inc., Cupertino, CA (US)

( * ) Notice: Subject to any disclaimer, the term of this patent is extended or adjusted under 35 U.S.C. 154(b) by 592 days.

(21) Appl. No.: 09/798,701

(22) Filed: Mar. 2, 2001

(65) Prior Publication Data

US 2002/0147947 A1    Oct. 10, 2002

(51) Int. Cl.
    *G06F 11/00*    (2006.01)
(52) U.S. Cl. ..................................... 714/704
(58) Field of Classification Search ............... 714/704, 714/705, 706, 707
See application file for complete search history.

(56) References Cited

U.S. PATENT DOCUMENTS 5,623,497 A * 4/1997 Shimawaki et al. ........ 714/704
6,076,175 A * 6/2000 Drost et al. .................. 714/704

OTHER PUBLICATIONS

"Multi-Gigabit Interconnect Chip", Vitesse, Semiconductor Corporation data sheet, Oct. 23, 2000. pp. 1-38.

* cited by examiner

*Primary Examiner*—Guy Lamarre
*Assistant Examiner*—James C. Kerveros
(74) *Attorney, Agent, or Firm*—Sawyer Law Group LLP

(57) ABSTRACT

Error codes output from a serializer/deserializer in a node of a communications network are detected by error decode logic that assumes that each new error occurrence reflects a one bit error in the word giving rise to the error code. Each error occurrence is then counted. When the error count reaches a predetermined limit (e.g., 250 errors), the total bit count required to accumulate the 250 errors is then determined. The total bits can be determined based on a clock count (time). The BER is then calculated based upon the fixed error limit and the total bit count. This BER is then reported and used to determine the health of the network.

21 Claims, 2 Drawing Sheets

DETECTING BIT ERRORS IN A COMMUNICATIONS SYSTEM

FIELD OF THE INVENTION

This invention relates to digital communications systems and, in particular, to a technique for more accurately measuring bit error rates in such systems.

BACKGROUND

Determining the bit error rate (BER) in received transmissions is one way to measure the health of a communications network. The BER is usually given in terms of bit errors divided by the total number of bits. Typical BERs are less than $10^{-9}$, while very poor BERs are greater than $10^{-5}$. If the BER from a particular node or link in the network is consistently too high, the network may reroute traffic to avoid the source of the errors, and the faulty node/link can be fixed.

Typically, digital data is transmitted within packets or frames in accordance with one of a variety of well known standards. Such packets or frames contain headers, payload data, and other fields and frequently contain thousands of bits. One of these fields is typically an error detection field, such as a cyclic redundancy check (CRC) field that identifies if there is any error in the packet or frame. CRC's used for error detection do not determine the number of bit errors in the frame or packet, although such information would be valuable.

Another problem with bit error detection in present systems is that transmission errors are typically only detected while transmitting packets in the network. Therefore, if a problem occurs in the network, payload data is lost before the problem is detected. In addition, the reliability and speed of detecting the problem depend on the rate at which packets are transmitted.

Accordingly, what is needed is a technique that reliably measures the health of a communications network without suffering from the drawbacks described above.

SUMMARY

In one embodiment of the present invention, a node in a communications network uses a commercially available serializer/deserializer (SERDES) that receives words in a serial bit stream from the network and outputs corresponding words as parallel bits to the node for further processing. One suitable SERDES converts a 10 bit serial word into an 8 bit parallel word in accordance with a well known 8B/10B standard used in Gigabit Ethernet. Such commercially available SERDES devices generate error codes that identify various types of errors such as out-of-band errors, disparity errors, and loss of synchronization. Such codes are then output on status pins of the SERDES device. In one embodiment of the invention, these error codes are detected by error decode logic which assumes that each new error occurrence reflects a single bit error in the word giving rise to the error code.

Each error occurrence is then counted. When the error count reaches a predetermined limit (e.g., 250 errors), the total bit count required to accumulate the 250 errors is then determined. The total bits can be determined based on a clock count (time). The BER is then calculated based upon the fixed error limit and the total bit count. This BER is then reported and used to determine the health of the network.

Basing the BER on the time (or bit count) it takes to accumulate a predetermined number of errors has various advantages. First, as compared to detecting the number of errors over a fixed period of time, the present technique provides a more accurate BER, since more time is taken to accurately measure a low BER. Second, the present invention allows poor (high) BERs to be detected more rapidly than good bit error rates, enabling the network to reroute traffic or otherwise solve the problem more quickly.

Additionally, one embodiment of the invention detects the bit error rate in IDLE words that are constantly being transmitted over the network to maintain bit level synchronization of the nodes. This is in contrast to prior art packet systems that only detect errors in transmitted packets. Since the health of the network is constantly monitored, problems with the network can be fixed before any payload data is lost.

Additional features of various embodiments improve the reliability and accuracy of determining bit error rates.

DETAILED DESCRIPTION OF THE EMBODIMENTS

Figure 1:
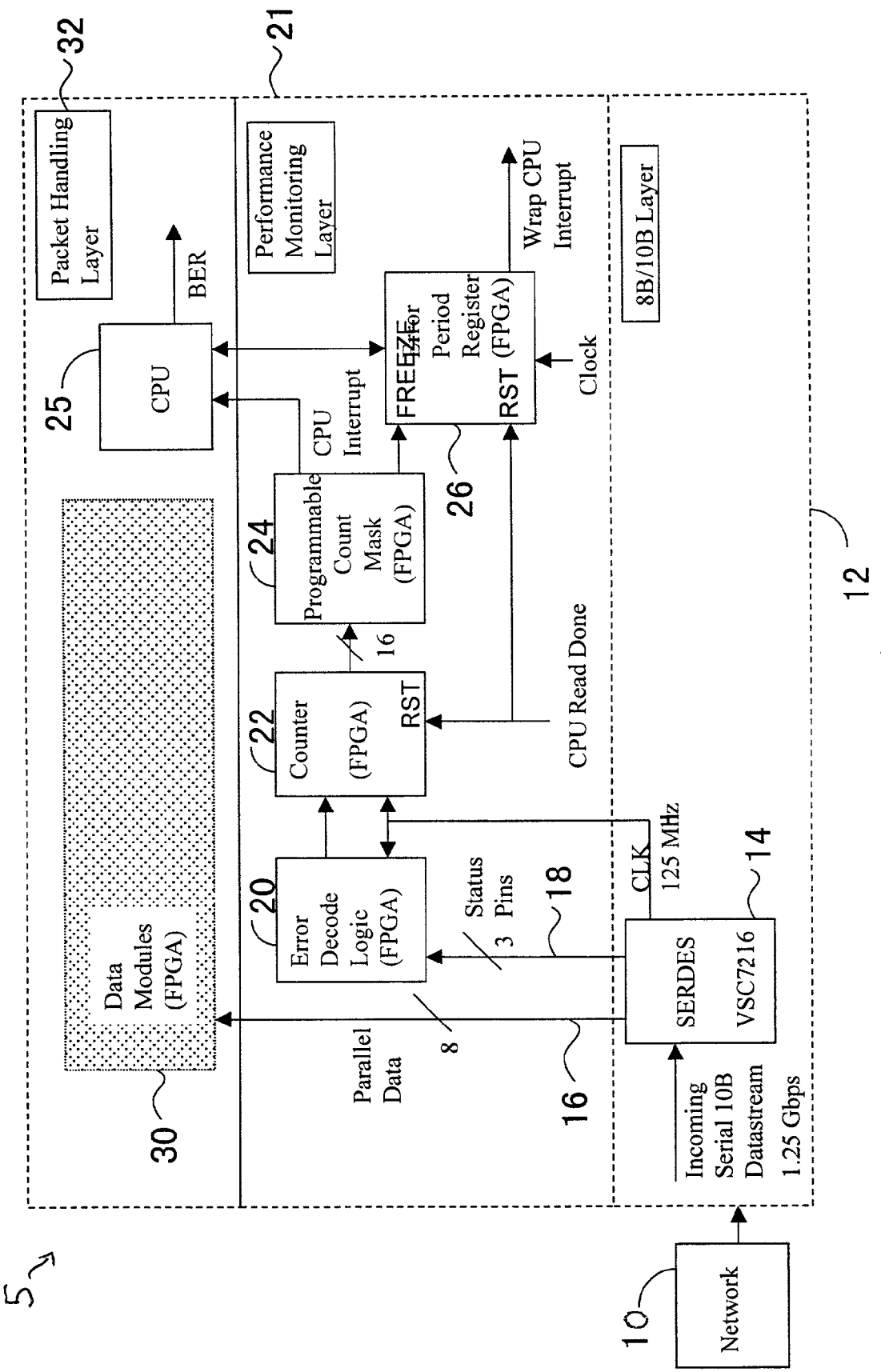
FIG. 1 illustrates various functional blocks of a node in a communications network for carrying out one embodiment of the present invention.
Figure 2:
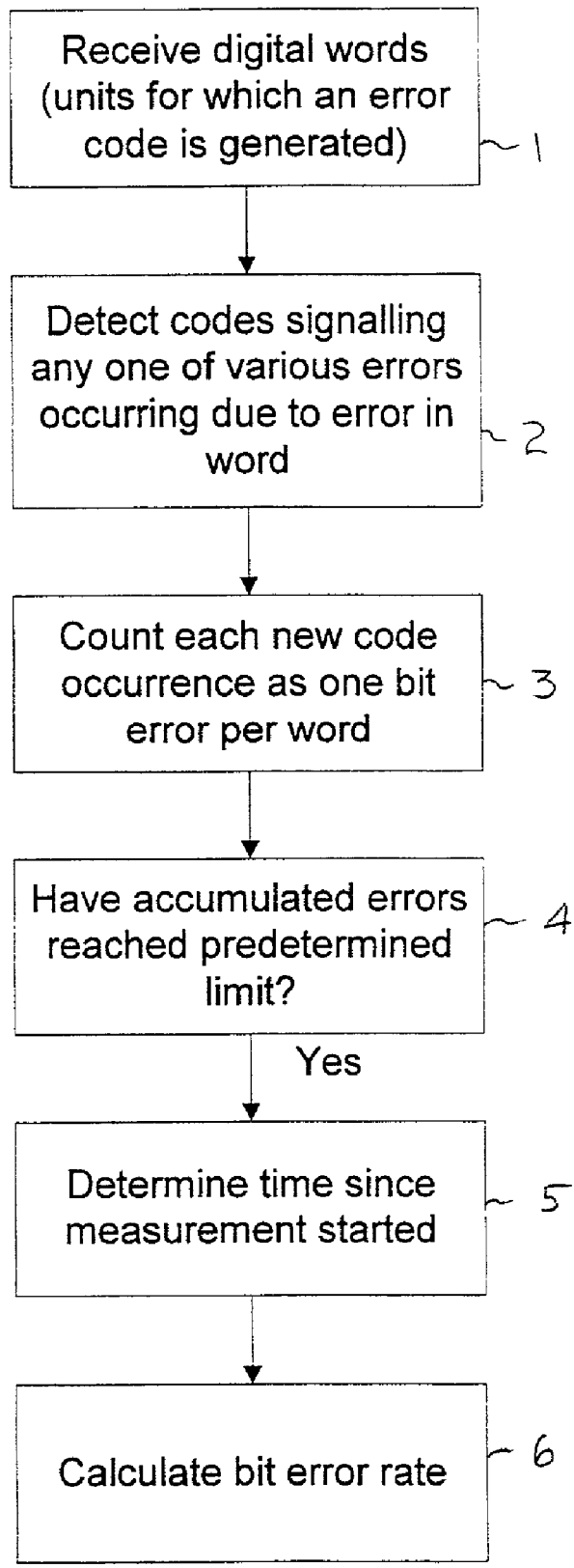
FIG. 2 is a flowchart identifying various steps used in one embodiment of the invention.

FIG. 1 illustrates a portion of a node 5 in a communications network that provides an accurate bit error rate (BER) for a data stream entering the node. In one embodiment, the circuitry guarantees that greater than 99% of the time the BER measurement will differ 10% or less from the actual BER.

In FIG. 1, the communications network 10 is shown transmitting a serial data stream to an input portion of the node 5 referred to as an 8B/10B layer 12. This 8B/10B format is convenient since error indications are available from the SERDES device, where error indications are provided independently of packet CRC's. However, the particular data format used by network 10 is not significant for carrying out the invention.

In an 8B/10B format, a transmitting node converts an original 8 bit word of parallel bits into a serial word of 10 bits. There are two different 10 bit words that correspond to an original 8 bit word. One of the 10 bit words has a positive disparity, and the other 10 bit word has a negative disparity. Disparity refers to the balance of 1's and 0's in the transmitted data. The disparity of the 10 bit word is chosen in accordance with the 8B/10B standard to provide a neutral disparity over successive words. The 10 bit words are also devised so there is a maximum number of possible consecutive 1's and 0's that may be transmitted. A large number of sequential logical 1's creates baseline wander, a shift in the long-term average voltage level used by the receiver as a threshold to differentiate between 1's and 0's. By utilizing a 10-bit word with a balanced number of 1's and 0's, the baseline wander is greatly reduced.

Additionally, in certain systems, such as in SONET systems where the various nodes are synchronized with one another, transitions between 1's and 0's are used to synchronize clocks. More generally, systems which utilize clock and data recovery circuits to recover clock use transitions between 1's and 0's. The 8B/10B format ensures sufficient transitions to keep the clocks synchronized.

Such an 8B/10B coding scheme is well known and commonly used in Gigabit Ethernet. Such encoding is described in detail in the book, "Gigabit Ethernet" by Rich Seifert, 1st ed., Addison Wesley Longmon, Inc., 1988, incorporated herein by reference. The 8B/10B standard is further described by Peter A Franaszek and Albert X. Widmer in U. S. Pat. No. 4,486,739, entitled "Byte Oriented DC-Balanced (0,4) 8B/10B Partitioned Block Transmission Code," assigned to IBM and incorporated by reference. One commercially available device for performing 8B/10B conversion is the model VSC7216UC-01 parallel-to-serial and serial-to-parallel transceiver chip by Vitesse Semiconductor Corporation, Camarillo, Calif. The VSC7216UC-01 data sheet is incorporated by reference. Such a chip is also referred to as a serializer-deserializer or SERDES.

In FIG. 1, the stream of 10 bit serial words is applied to a SERDES device 14. The serial data stream may have been already partially processed by the node such as by converting optical signals into electrical signals.

The VSC7216 SERDES 14 converts the 10 bit per word serial stream into 8 bit parallel words on lines 16 for further processing. Multiple channels may be used, but only one channel is shown in FIG. 1 for simplicity.

The VSC7216 SERDES 14 also has three status pins 18 outputting a 3-bit error code. The VSC7216 designates these three status pins as ERRn, KCHn, and IDLEn, where n designates the channel. The following table shows the link status, priority, and synchronization state associated with the various code combinations on the three status pins.

Although these three error codes do not expressly indicate how many bit errors gave rise to the particular error code, there is an extremely high probability that the error is due to a single bit error. Accordingly, the generation of each error is assumed to be a single bit error.

The SERDES 14 generates a clock signal corresponding to the incoming data rate, which, in this example, is 1.25 Gbps. Since each incoming word is 10 bits long, the word frequency is 125 MHz. A 125 MHz clock signal is generated by the SERDES 14 and applied to error decode logic 20 in the performance monitoring layer 21. Logic 20 in one embodiment is a field programmable gate array (FPGA). The error decode logic 20 decodes the signals on the three status pins 18 and determines whether they correspond to the three errors previously mentioned: out-of-band error, disparity error, or loss of synchronization. Each separate occurrence of any one of the three errors is determined to be a single bit error. The 125 MHz clock applied to the error decode logic 20 causes the logic 20 to output an error signal, when appropriate, only for the incoming 10-bit word giving rise to the error code.

As mentioned above, one function of a comma code is to identify to the receiver node where a new packet of data begins. The data words within the packet are prohibited from being a comma code. However, a bit error in the data within the packet may cause the data to contain the comma code, causing the receiver to synchronize on the false comma. As a result, loss of synchronization ultimately occurs and all the remaining bits in the packet are classified as errors. Since all

| ERRn | KCHn | IDLEn | Link Status | Priority | Synch State |
|------|------|-------|-------------|----------|-------------|
| 0 | 0 | 0 | Valid Data | 7 | Synch_Acquired |
| 0 | 0 | 1 | Underrun/Overrun | 1 | Synch_Acquired |
| 0 | 1 | 0 | Kxx.x special character other than IDLE | 6 | Synch_Acquired |
| 0 | 1 | 1 | IDLE | 5 | Synch_Acquired |
| 1 | 0 | 0 | Out-of-band-Error | 3 | Synch_Acquired |
| 1 | 0 | 1 | Disparity Error | 4 | Synch_Acquired |
| 1 | 1 | 0 | Loss of synchronization | 2 | Loss_of_Sync |
| 1 | 1 | 1 | RESYNCH | 2 | RESYNC |

Three link status messages are used in one embodiment of the invention: out-of-band error, disparity error, and loss of synchronization. An out-of-band error detected by the SERDES 14 means that the received 10 bit word does not match any acceptable 10 bit word in the 8B/10B standard. A disparity error signifies that the received 10 bit word matches a possible 10 bit word but that the positive or negative disparity of the word is not in accordance with the 8B/10B standard. A loss of synchronization code typically reflects that a bit error in a 10 bit word caused that word to be an unintended synchronization word (called a comma) or that an intended synchronization word contained a bit error. Such commas are transmitted between packets and during idle periods. The first non-comma word after a comma is understood by the node to be the start of a new packet. If a word in a packet contains an error that causes the word to match the comma code, a loss of synchronization will ultimately occur, and the packet data will not be processed. The loss of synchronization will typically continue only until the end of the packet, when comma codes will be transmitted to resync the nodes.

As seen in the above table, if more than one of the errors occur simultaneously, the relative priority will determine which error code is generated by the SERDES 14.

the errors in the packet are most likely attributed to a single bit error giving rise to the false comma, the error decode logic 20 is programmed to treat this loss of synchronization as a single bit error rather than an error in each of the 10-bit words that follow in the packet. Hence, logic 20 outputs a single error pulse at the output of logic 20 during one word period when it detects a loss of synchronization code.

The comma codes, along with other information, are continually transmitted even though no customer is transmitting payload data, in order to keep the data recovery clocks in the various nodes synchronized to their respective incoming data streams. If these comma codes contain errors, such errors would be designated on the status pins 18 of the SERDES 14 and constitute a bit error. Accordingly, bit errors are ascertained by the error decode logic 20 even when the network is not being used for transmitting payload data. This is advantageous since a problem with the network can be determined and subsequent traffic rerouted prior to the problem with the network dropping packets.

The present application focuses on techniques to accurately determine the BER and does not describe in detail other functions of the performance monitoring layer 21. One such other function is to determine whether a loss of synchronization has occurred for greater than a threshold period of time, signifying a problem in the network. Such an event triggers such possible actions as rerouting of packets around the faulty node or link. Another function of the performance monitoring layer 21 is to determine if the resulting BER is poor enough to warrant the rerouting of data to avoid the source of the problem.

The error pulses output by error decode logic 20 are applied to an error counter 22, which may also be within the error decode logic FPGA. Counter 22 is clocked by the 125 MHz word clock. Counter 22 increments its count by one during a clock pulse if the error decode logic 20 outputs an error signal.

A programmable count mask 24 receives the count from counter 22. Upon detecting a predetermined count from counter 22, the count mask 24 interrupts a CPU 25, used by the node for various functions, which then calculates the BER for the system. One skilled in the art would understand the simple software used by the CPU to calculate the BER. In one embodiment, the programmable count mask 24 detects when the counter 22 has reached the count of 250 prior to initiating the CPU interrupt. Using the Tchbeychev inequality, it has been shown that 250 errors are required to guarantee that greater than 99% of the time the BER measurement will differ by 10% or less from the actual BER. The fixed error threshold to trigger the calculation of the BER may be greater than or less than 250, such as between 100–1000, and preferably between 200–400. If the error threshold is too high, it will be difficult to count the time between BER measurements. If the error threshold is too low, the accuracy of the BER suffers. The error counter 22 is reset after the CPU reads the data.

The programmable count mask 24 may be deleted if the counter 22 is the type that wraps around when it reaches the error threshold. A comparator may sense when the counter wraps around to zero and initiates the CPU interrupt. Using a programmable count mask 24 adds flexibility to the system.

An error period register 26 determines the time since counter 22 was last reset. This time corresponds to the number of bits received by the node since the last reset time. Register 26 may be configured as a counter connected to the 125 MHz word clock. Upon the count mask 24 generating the CPU interrupt, the count mask 24 freezes the error period register 26, and the CPU reads the error period register value. The CPU then calculates the bit error rate based on the fixed 250 bit count and the error period register value (corresponding to the number of bits received by the node since the last reset time).

For good (low) BERs, register 26 must be able to store very large times. For example, if register 26 is simply a time counter that increments at the 125 MHz clock rate (each clock pulse signifying a 10 bit word), the counter/register 26 will have to be extremely large to not roll over prior to the error threshold being met. To reduce the size of register 26, one possibility is to clock register 26 with a much slower clock (e.g., 128 KHz or less) with a rollover duration of, for example, about one-half second (512ms, 16 bits). The resolution of the time (or bit count) suffers, but this tradeoff may be satisfactory. With registers having a limited time capacity, BERs below a certain value could not be calculated. If necessary, higher layers can keep track of the number of error period register rollovers and use that count along with the rollover period in the computation of the BER as described above.

To extend the range of the BERs that can be calculated, the clock speed of the register 26 can be made variable, whereby a good BER is timed at a clock rate lower than the rate used for a poor BER. One way that this can be done is by detecting if the register 26 has rolled over and, in response, dividing down the clock rate and resetting the error counter 22.

Once the CPU 25 has read the count values, the CPU then sends a signal to the reset ports of the counter 22 and the error period register 26. The BER may then be reported in a status report to the operator of the system and, in one embodiment, is automatically used by the node itself to determine the health of the network.

In another embodiment, the CPU 25 periodically polls the counter 22 to see if it has reached the count of 250 (or other threshold). If so, the CPU 25 freezes the error period register 26 (and the counter 22 as required) and performs the BER calculation. The polling period may be made dependent on the BER.

In one embodiment, if the BER is below an acceptable value (e.g., $10^{-5}$), the node 5 transmits a status message to the other nodes, allowing the other nodes to reroute traffic to avoid the source of the problem. The 10 bit serial data stream transmitted to node 5 may be periodic test messages sent out from neighboring nodes to determine the status of the neighboring nodes and the links between the neighboring nodes and node 5. Thus, node 5 can determine the source of any poor BERs. Once the BER improves, a new status message is sent, and normal routing can be resumed. Another register is used to determine whether the BER has improved.

If the BER is poor, the CPU 25 will be frequently interrupted. To reduce the frequency of interruptions, the interrupt signal may be intermittently blocked until the BER has improved.

The 8 bit parallel data on lines 16 sent out by SERDES 14 may be processed by conventional data modules 30 in a packet handling layer 32 that perform functions such as decoding, parsing, and routing the data. The data modules 30 are independent of the present invention. Outgoing data is transmitted by the transmitter portion of the SERDES 14.

Accordingly, embodiments of a technique to more accurately measure the BER of a system have been described and may be implemented using off-the-shelf components (e.g., SERDES, FPGAs). FPGAs are easily programmable to carry out the above techniques. Although a hardware implementation has been shown, any combination of hardware and software may be used to carry out the invention. The system need not rely on any 8B/10B encoding.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope with this invention.

What is claimed is:

1. A technique for determining a bit error rate comprising:
receiving a digital signal;
resetting an error counter and starting a time counter;
detecting errors in said digital signal, wherein said error counter is updated for each error detected;
determining when said errors counter reaches a predetermined threshold;
stopping the time counter when said errors counter reaches said predetermined threshold; and
calculating a bit error rate based upon said predetermined threshold and a value of the time counter.

2. The method of claim 1 further comprising:
   determining a value corresponding to the number of bits received during the time it took for said errors to reach said threshold; and
   calculating said bit error rate based on said threshold and said value.

3. The method of claim 1 wherein said digital signal is a serial data stream and wherein said detecting errors comprises detecting errors by a deserializer that converts incoming serial-bit words to parallel-bit words.

4. The method of claim 3 wherein said deserializer converts a serial 10 bit word to a parallel 8 bit word.

5. The method of claim 3 wherein said deserializer performs the method of detecting positive and negative disparities of said serial-bit words and generating a disparity error signal if a disparity is inconsistent with a predetermined data format.

6. The method of claim 1 wherein said detecting errors comprises determining errors based upon whether a disparity of an incoming digital word is not of a predicted disparity.

7. The method of claim 1 wherein said detecting errors comprises determining whether a received digital word meets a requirement for an acceptable word.

8. The method of claim 1 wherein said detecting errors comprises determining a loss of synchronization.

9. The method of claim 1 wherein said detecting errors comprises detecting at least out-of-band errors, disparity errors, and loss of synchronization.

10. The method of claim 9 wherein each of said out-of-band errors, disparity errors, and loss of synchronization errors is treated as a single bit error.

11. The method of claim 1 wherein said predetermined threshold is between 100–1000 bit errors.

12. The method of claim 1 wherein said predetermined threshold is 250 bit errors.

13. A circuit for determining a bit error rate comprising:
   a receiver for receiving digital information and determining whether said information contains errors;
   an error counter for counting errors;
   a count detector connected to an output of said error counter for detecting when said error counter reaches a predetermined error threshold value;
   a clock cycle counter for storing a value corresponding to a time from when said error counter is reset to when said error counter to reaches said predetermined error threshold value; and
   a processing circuit for calculating a bit error rate based upon said threshold and said value.

14. The circuit of claim 13 wherein said receiver is a serializer/deserializer.

15. The circuit of claim 14 wherein said serializer/deserializer is a model VSC7216 serializer/deserializer.

16. The circuit of claim 13 further comprising a word clock providing clock signals to said error counter and said clock cycle counter.

17. The circuit of claim 13 wherein said circuit is part of a Gigabit Ethernet.

18. The circuit of claim 13 wherein said error counter wraps around when said error counter reaches said threshold.

19. The circuit of claim 13 wherein said processing circuit resets said error counter and said clock cycle counter after reading values output by said error counter and said clock cycle counter.

20. The circuit of claim 13 wherein said threshold is between 100–1000 errors.

21. The circuit of claim 13 wherein said threshold is 250 errors.

* * * * *